Dec. 21, 1965  W. N. KEMNITZ  3,224,826
MOTOR DRIVEN FOOD MIXER
Filed Sept. 16, 1964  2 Sheets-Sheet 1
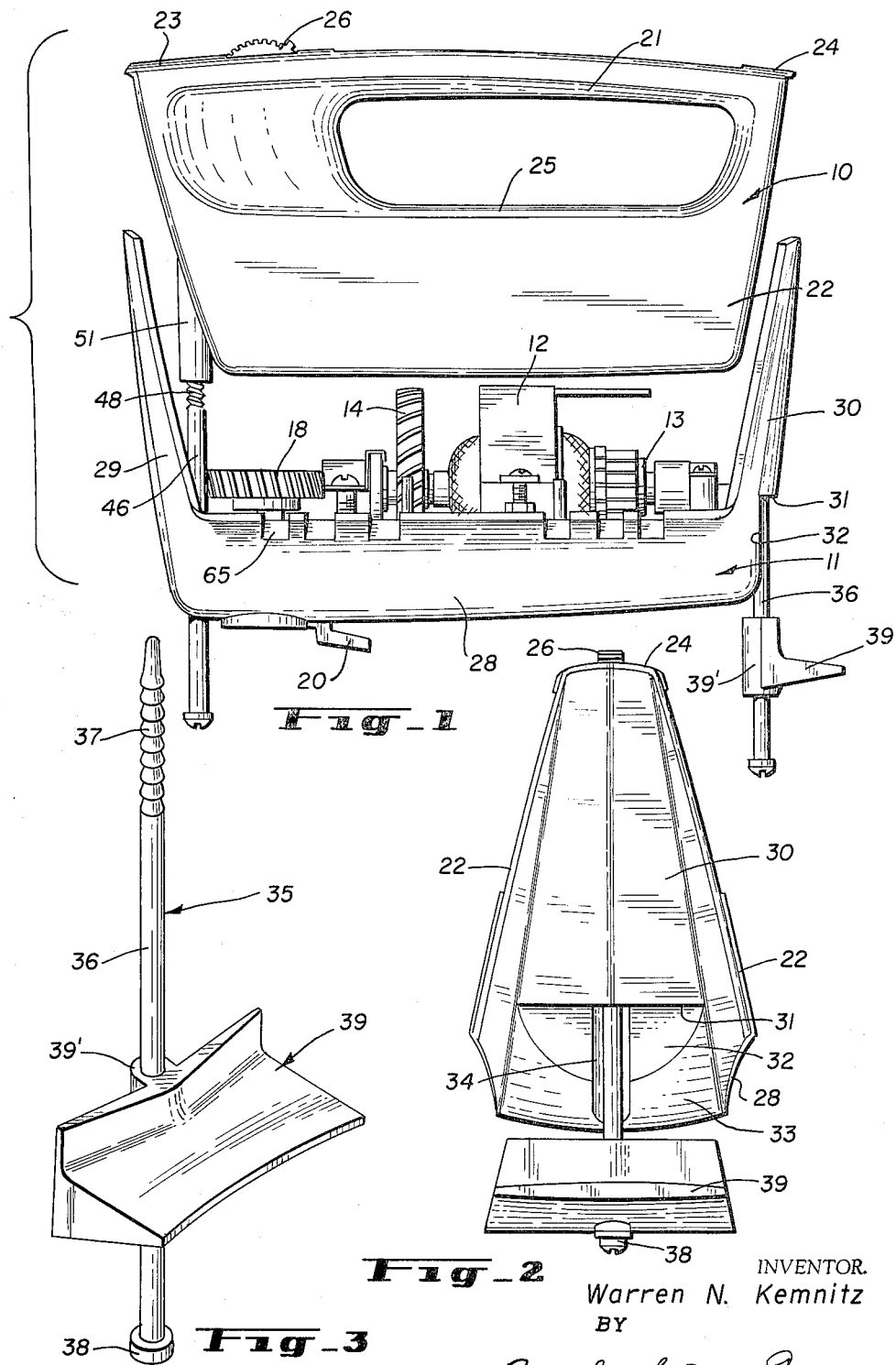
INVENTOR.
Warren N. Kemnitz
BY
Bertha L. MacGregor
ATTORNEY Dec. 21, 1965  W. N. KEMNITZ  3,224,826
MOTOR DRIVEN FOOD MIXER
Filed Sept. 16, 1964  2 Sheets-Sheet 2
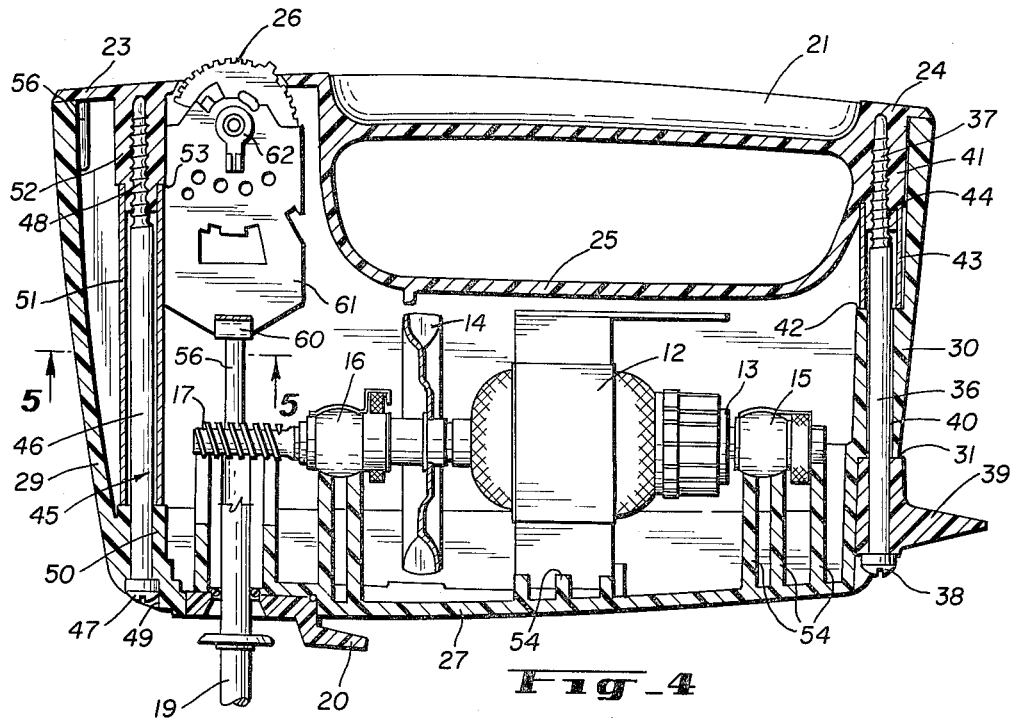
Fig_4
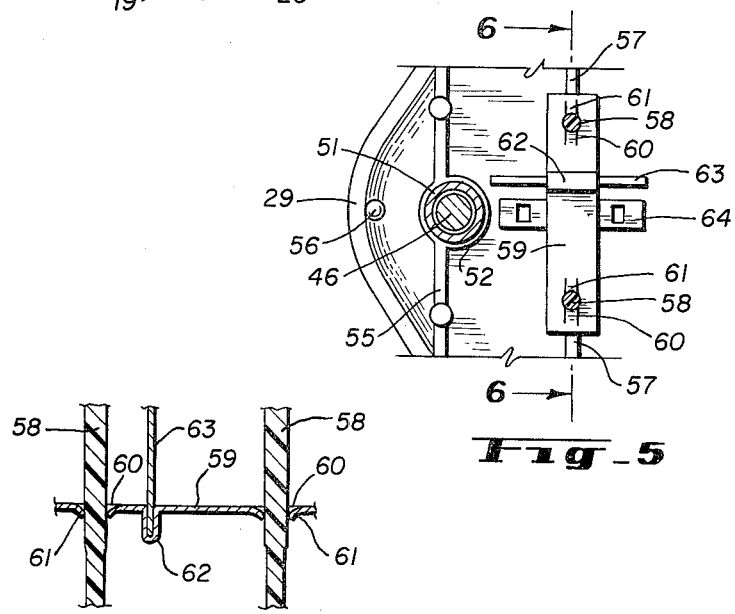
Fig_5
Fig_6
INVENTOR.
Warren N. Kemnitz
BY
Bertha L. MacGregor
ATTORNEY United States Patent Office 3,224,826
Patented Dec. 21, 1965

3,224,826
MOTOR DRIVEN FOOD MIXER
Warren N. Kemnitz, Racine, Wis., assignor to Scovill Manufacturing Company, Waterbury, Conn., a corporation of Connecticut
Filed Sept. 16, 1964, Ser. No. 396,825
6 Claims. (Cl. 312—223)

This invention relates to motor driven food mixers and more particularly to a light weight portable mixer adapted to be held by the hand of the user while in operation.

The main object of the invention is to provide a motor driven food mixer which has a housing made of light weight non-metallic material, such as plastic, consisting of an upper and a lower member connected together by only two screws. The housing members are so formed and constructed that they cooperate to mutually support and reinforce each other, whereby exceptionally thin and light weight material may be used in the manufacture of the housing without detriment to durability of the mixer.

Another object of the invention is to provide a rear end support for the mixer when not in use, said support being molded separately and attached to the housing by one of the two screws which connect the two housing members together. Making the rear end support separately instead of molding it integrally as part of one of the housing members greatly simplifies the production of the housing and reduces cost.

Another object of the invention is to provide very simple and efficient means for mounting the switch mechanism in the upper housing.

Another object of the invention is to provide reinforcing means which cooperate with the two screws which connect the housing members together, whereby the light weight thin-material housing is rendered very durable and efficient to withstand stresses normally imposed thereon.

Other objects and advantages will be apparent from the drawings and the following specification.

In the drawings:

FIG. 1 is an exploded elevational side view of the upper and lower housing members of the mixer, the housing connecting means and mechanism mounted on the lower housing, the beater and their shafts being omitted.

FIG. 2 is an elevational rear end view of the parts as shown in FIG. 1.

FIG. 3 is a perspective view of the rear end support and of the long screw which connects the housing members and said support at the read end of the mixer.

FIG. 4 is a vertical longitudinal sectional view through the assembled mixer parts.

FIG. 5 is a horizontal sectional view through the forward portion of the mixer, in the plane of the line 5—5 of FIG. 4.

FIG. 6 is a vertical sectional view of a detail of construction, in the plane of the line 6—6 of FIG. 5, showing the switch mounting means.

In that embodiment of the invention shown in the drawings, the mixer comprises an upper housing 10 and a lower housing 11, which when assembled enclose and support conventional motor parts such as the armature 12, shaft 13, fan 14, shaft bearings 15, 16 and beater shaft driving mechanism including the worm 17 and worm gears 18. Beater shafts 19 are shown broken away. An ejector for the shafts 19 is designated 20.

The upper housing 10 comprises a longitudinally extending handle 21 integral with two downwardly diverging side walls 22 which extend downwardly from the forward top wall 23, the rearward top wall 24 and the intermediate upper wall 25 which is spaced from the handle 21. A manually operable speed control disc 26 extends through an opening in the top wall 23. The handle 21 and the walls 22, 23, 24 and 25 are molded integrally, the side walls 22 being spaced apart and open at their two ends and bottom to fit over the lower housing 11.

As best shown in FIG. 1, the lower housing 11 comprises a generally flat bottom 27 integral with short upwardly curved side walls 28, a vertically elongated front end wall 29 and a vertically elongated rear end wall 30. The front end wall 29 is generally triangular in shape to fit between the diverging side walls 22 of the upper housing. The rear end wall 30 also is generally triangular in shape, with its outer surface cut away as indicated at 31 to provide a flat surface 32 merging into the curved surface 33 between the side walls 28 of the lower housing. The surfaces 32 and 33 are recessed as indicated at 34 to provide a vertically extending opening which is partially circular in horizontal cross section to receive parts shown in FIG. 3 and described hereinafter.

A screw 35 provided with a long shank 36, screw threads 37 and head 38, as shown in FIGS. 1–3, extends upwardly through the sleeve 39' formed integrally on the inner surface of the rear end supporting member 39, then upwardly through a bore 40 in the end wall 30 of the lower housing 11, and into an internally threaded bore 41 in the upper housing 10. The bore 41 is engaged by the threaded portion 37 of the long screw 35. Thus the housings 10, 11, and the rear end support 39 are connected together by a single screw 35 as shown in FIG. 4. The bore 40 extends upwardly in the end wall 30 to the shoulder 42 which is spaced from the inner surface of the upper housing rear top wall 24. A short metal tube 43 rests on the shoulder 42 of the lower housing 10 and extends upwardly to said inner surface of the upper housing as indicated at 44. The tube 43 surrounds part of the long screw 35 and relieves the non-metallic housing members of strain when they have been drawn together and the screw is in the position shown in FIG. 4 with its head 38 bearing against the lower housing and its threaded end 37 engaging the threaded bore 41 of the upper housing. That portion of the upper housing 10 which surrounds the bore 41 above the shoulder 44, and that portion of the rear end wall 30 which surrounds the bore 40 below the shoulder 42, are defined in the claims as bosses.

The forward ends of the housings 10, 11 are also connected together by a screw 45 provided with a long shank 46, head 47 and threaded end portion 48. The head 47 is located in a recess 49 in the forward end of the bottom wall 27 of the lower housing. The shank 46 extends upwardly through a bored boss 50, molded integrally with the lower housing, then through a metallic tube 51 and into the internally threaded boss 52 which depends from the forward center of the top 23 of housing 10, engaged by the threaded screw portion 48. The tube 51 is long enough to seat on the bored boss 50 and bear against the shoulder 53 on the lower end of the depending boss 52. When the long screw 45 is in the position shown in FIG. 4, the upper and lower housing members are drawn toward each other into assembled position but without strain on the non-metallic housings, due to the presence of the tube 51 which spaces the housings in proper relative positions and reinforces the end wall 29 of the lower housing.

The lower housing 11 is provided with integrally molded supports 54 which rise from the bottom 27 for supporting motor elements such as the bearings 15, 16, and armature 12. Strap members overlying some of the elements may be secured to the supports 54 to ensure firm mounting.

The upper housing 10 is provided interiorly with a depending transversely extending partition 55 which merges with the boss 52 shown in FIG. 5. An abutment 56 depends from the top wall 23 of the upper housing to serve as a stop against which the front end wall 29 bears when the parts are assembled as shown in FIG. 4.

Inwardly of the partition 55 and parallel thereto are two short walls 57 which depend from the top of the upper housing. A vertically disposed rod 58 extends downwardly from each of the walls 57 near its inner edge. The rods 58 support a switch supporting cross piece 59 provided near each end with a pair of spaced apart parallel slits 60 which extend longitudinally of the cross piece 59 and form tongues 61 for gripping the rods 58. The cross piece 59 is bent transversely as indicated at 62 to form a groove for reception of the lower edge of the switch plate 63. Switch mechanism 64, operatively connected to the control disc 26, is mounted on the plate 63. When the lower edge of the plate 63 has been inserted in the cross piece 59, as shown in FIG. 6, the support is mounted on the rods 58 by sliding motion so that the rods pass between the ends of a pair of tongues 61 at each end of the support 59, thereby causing the tongues to bend downwardly and to grip the rods 58 firmly without employing any other fastening means.

The lower housing walls 28 are provided with a series of depressed areas 65 which function as ventilating notches between the upper and lower housings when assembled.

In describing the invention, reference has been made to a particular example embodying the same, but I wish it to be understood that the invention is not limited to the specific construction shown in the drawings and that changes may be made in the construction and general arrangement of parts without departing from the invention.

I claim:
1. A motor driven food mixer comprising
    (a) an upper housing having an integrally formed handle, top wall and downwardly divergent side walls, open at its ends,
    (b) a lower housing comprising an integral base having a single aperture near each end, upwardly extending side walls and vertically elongated end walls which close the open ends of the upper housing,
    (c) internally threaded bosses depending from the top wall of the upper housing adjacent each of its ends,
    (d) bored bosses rising from the inner surface of the lower housing in axial alignment with said internally threaded bosses and communicating with said lower housing apertures,
    (e) a tubular member between each bored boss and an axially aligned threaded boss, and
    (f) means connecting said housings consisting of two elongated screws each having a head on one end and threads on its opposite end, extending through said lower housing apertures, bored bosses and tubular members into engagement with said threaded bosses for drawing the housings toward each other and holding said bosses in contact with opposite ends of the tubular members.

2. The motor driven food mixer defined by claim 1 which includes a separate rear end support provided with a vertical bore, said support being attached to the rear end of the lower housing by one of the screws which connects the housings together.

3. The motor driven food mixer defined by claim 2, in which the rear end surface of the lower housing is provided with a vertically extending groove, and the rear end support is provided with a vertically bored projection which fits in said groove and through which said screw extends.

4. A motor driven food mixer comprising
    (a) separate upper and lower housings,
    (b) internally threaded bosses depending from the inner surface of the upper housing adjacent each of its ends,
    (c) bored bosses rising from the inner surface of the lower housing in axial alignment with said internally threaded bosses,
    (d) apertures in the lower housing communicating with said bored bosses,
    (e) a tubular member between each bored boss and an axially aligned threaded boss,
    (f) means connecting said housings consisting of two elongated screws each having a head on one end and threads on its opposite end, extending through said lower housing apertures, bored bosses and tubular members into engagement with said threaded bosses for drawing the housings toward each other and holding said bosses in contact with opposite ends of the tubular members,
    (g) a pair of rods depending from the upper housing spaced apart transversely of the housing,
    (h) switch mechanism including a switch plate located between the rods, and
    (i) a cross piece frictionally held on said rods, said switch plate being supported at its lower edge on said cross piece.

5. The motor driven food mixer defined by claim 4, in which the cross piece is slit to form a pair of cooperating tongues near each end, said tongues frictionally engaging the rods when the cross piece is applied to the rods by an upwardly sliding movement.

6. A motor driven food mixer comprising
    (a) separate upper and lower housings,
    (b) means connecting said housings together near their forward ends,
    (c) a separate rear end support provided with a vertically bored projection,
    (d) a rear end surface on the lower housing complemental to said rear end support, said rear end surface being provided with a vertically extending groove into which the vertically bored projection of the rear end support fits,
    (e) an internally threaded boss in the upper housing adjacent its rear end, and
    (f) a headed screw extending through the lower housing and the rear end support, its headed end bearing on the lower housing and its opposite end engaging the threaded boss in the upper housing, thereby connecting the housings together and fixing the rear end support on said lower housing complemental surface.

References Cited by the Examiner
UNITED STATES PATENTS

| | | | |
|---|---|---|---|
| 1,933,074 | 10/1933 | Richardson | 312—265 |
| 2,397,306 | 3/1946 | Whipple | 312—244 X |
| 2,468,727 | 5/1949 | Bauman | 312—265 X |
| 2,469,932 | 5/1949 | Ritter | 259—108 |
| 2,502,832 | 4/1950 | Dockendorff | 312—7 X |
| 3,141,359 | 7/1964 | Bennett et al. | 310—50 X |

CLAUDE A. LE ROY, *Primary Examiner.*

CHANCELLOR E. HARRIS, *Examiner.*